March 14, 1944.  B. McKIM  2,344,316
TESTING SYSTEM
Filed Jan. 23, 1942  5 Sheets-Sheet 3

INVENTOR
B. McKIM
BY
ATTORNEY

March 14, 1944.   B. McKIM   2,344,316
TESTING SYSTEM
Filed Jan. 23, 1942   5 Sheets-Sheet 4

INVENTOR
B. McKIM
BY M<sup>c</sup>Kenney
ATTORNEY

March 14, 1944. B. McKIM 2,344,316
TESTING SYSTEM
Filed Jan. 23, 1942 5 Sheets-Sheet 5

INVENTOR
B. McKIM
BY
ATTORNEY

Patented Mar. 14, 1944

2,344,316

UNITED STATES PATENT OFFICE 2,344,316

TESTING SYSTEM

Burton McKim, East Orange, N. J., assignor to Bell Telephone Laboratories, Incorporated, New York, N. Y., a corporation of New York Application January 23, 1942, Serial No. 427,866

11 Claims. (Cl. 179—175.11)

This invention relates to telephone systems and more particularly to a control circuit for regulating testing equipment in such a system.

The object of the present invention is to provide a rapid and economical system of controlling the operations of a plurality of testing devices.

A feature of this invention consists in the division of a test control system common to a telephone office into a plurality of different master test control devices and a plurality of subtest devices differently controlled by each master test device, the devices operable for each master test controlling the association of different testing mechanisms with a particular character of circuits and equipments to be tested and controlling the connection of circuit leads from the testing equipment to the devices operable for making a cycle of different subtests of the circuits and equipments to be tested, the common test controlling system having a plurality of terminal connections throughout a telephone office.

Another and related feature of this invention consists in a portable remote control testing unit having control keys and resistances arranged according to a numerical system corresponding to master test numerical designations arranged for connection with differently located terminals of the common test control system for selectively operating the master test and subtest devices.

Another and related feature consists in a method and means for making a cycle of subtests or individual tests of units of equipment under the control of master test selecting and testing circuits which terminate the cycle of tests within the cycle or at the end of said cycle.

Another and related feature consists in actuating a cold cathode tube by either the operation or the release of a master test selecting relay for insuring the release of test controlling equipment operated for one master test before a subsequent master test can be made effective.

These and other features will be discussed more fully in the following description.

To illustrates the features of the invention reference may be had to the accompanying drawings in which Figs. 1 to 5 when arranged as indicated in Fig. 6 illustrate the detailed structure of the test control circuit.

Figure 1:
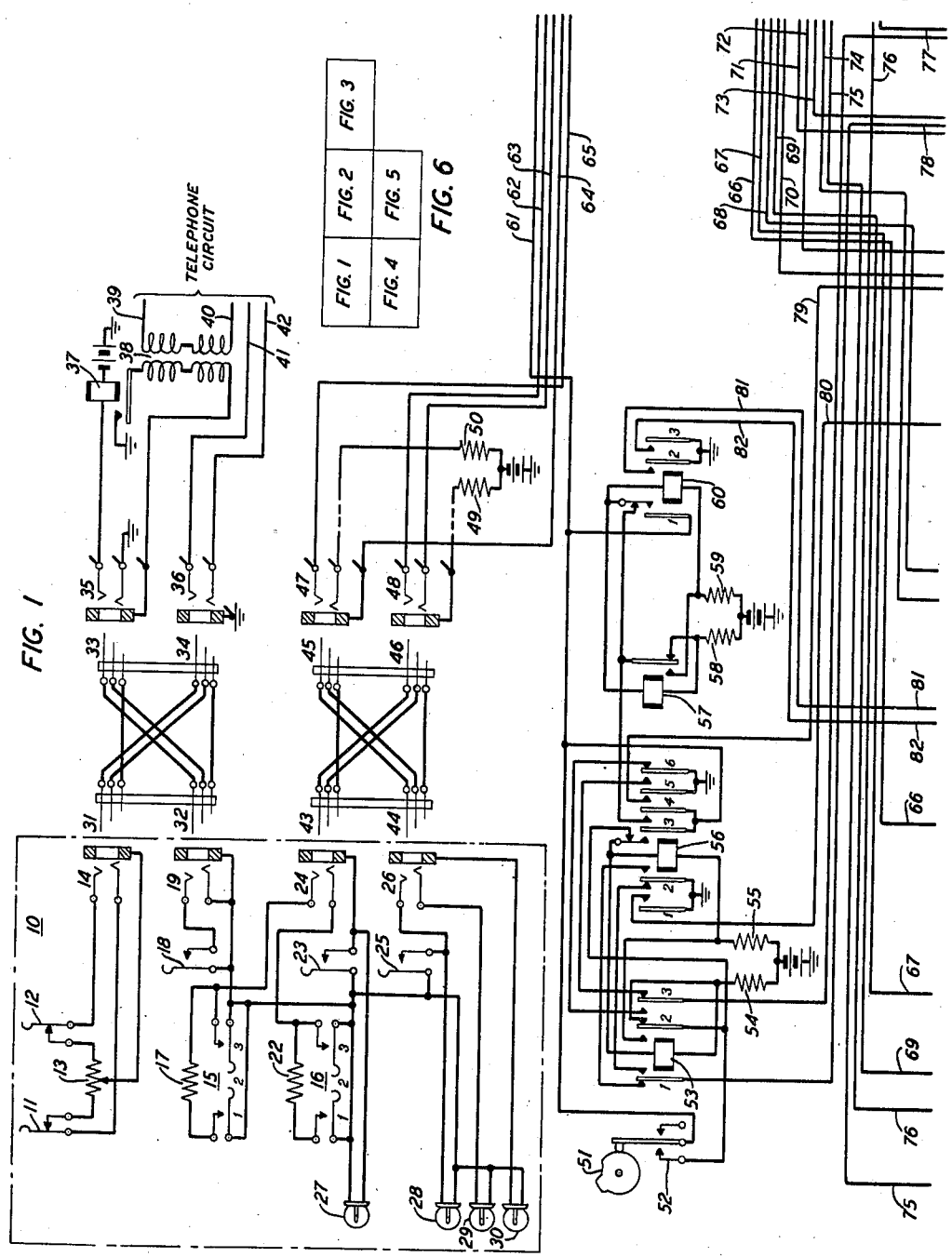
Fig. 1 illustrates a test control box, test jacks and patching cords for making connections from the control box to any of a plurality of such test jacks in a telephone office. An interrupter circuit for the testing circuit is also shown in the lower portion of this figure.
Figure 2:
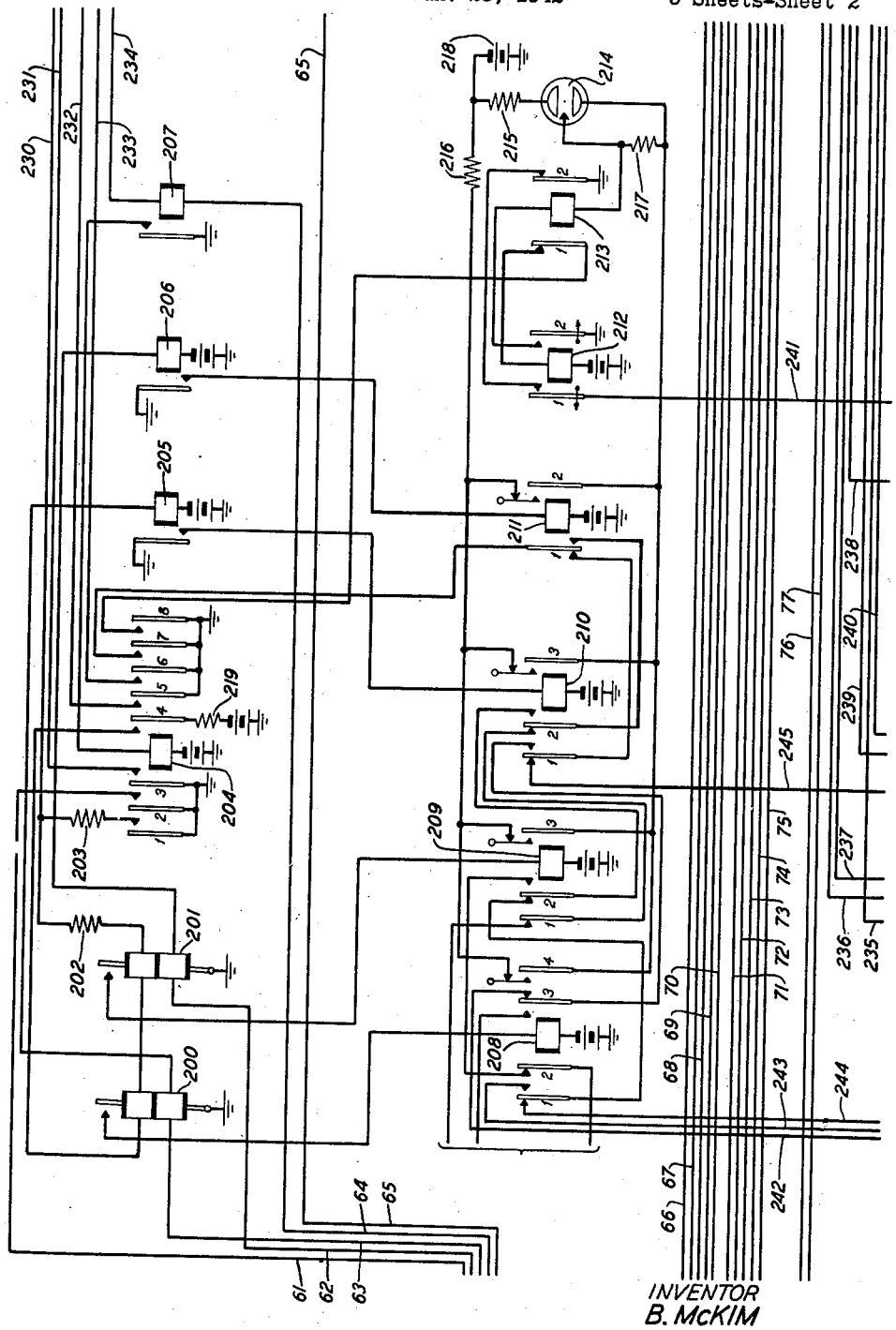
Fig. 2 illustrates master test selecting relays, test control relays and release control equipment.

The testing system illustrated in the drawings is adapted for testing many different apparatus units of a telephone office, each of which requires a plurality of individual tests. A plurality of jacks, such as jack 35, 36, 47 and 48 used as terminal connections for access to the test control system common to the office may be located on a number of different equipment units in multiple with each other so that the unit of equipment being tested is available to a test man for manipulation and observation during these tests. For example, these jacks and other jacks and plugs such as 532 and 533 may be placed in different locations in a manually operated switchboard for making a large plurality of tests of circuits and equipment in the switchboard and circuits and equipment outside of the switchboard which terminate in the switchboard positions and may be placed in different locations throughout the telephone office switching or apparatus room for testing circuits and equipments not accessible from the switchboard. The test box 10 is a portable test unit which may be patched, by use of the patching cords and plugs shown, to any of the jacks throughout the telephone office. The relays and other equipment common to the office may be mounted permanently on an apparatus frame and operated by remote control from test box 10.

Figure 5:
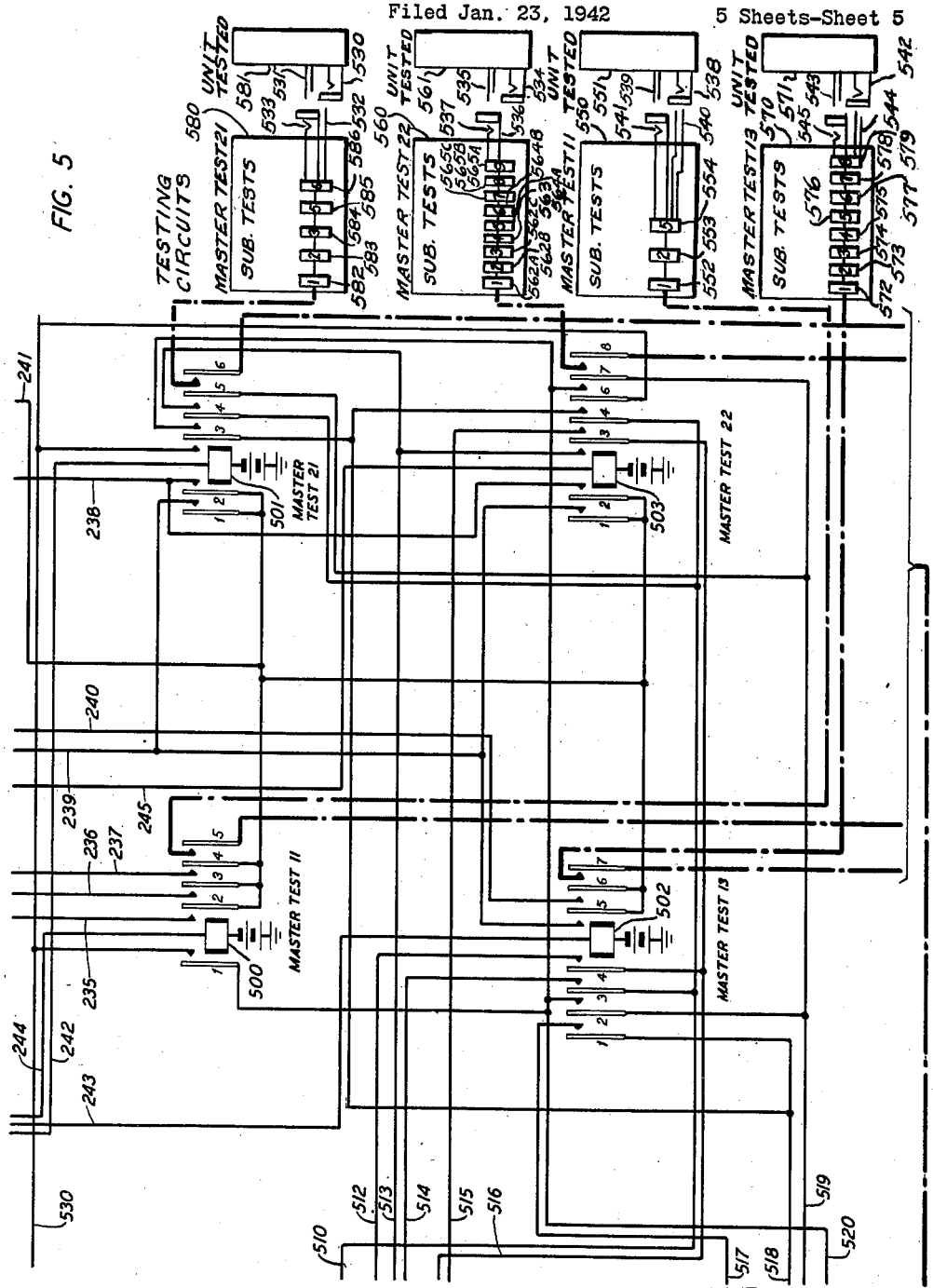
Fig. 5 illustrates a plurality of relays representing a plurality of master tests each arranged to control a cycle of tests of a particular unit of equipment and associated circuits.

A testing chart may be provided as a part of the test man's equipment which covers the test numbers for the units of equipment to be tested, known herein as master test numbers, and designate the plurality of individual subtests of each unit of equipment to be made under control of the master test equipment. This comprises a cycle of tests terminated by the master testing circuit. It will be noted that the switches or keys 15 and 16 in the portable test box 10 herein described as keys, are each numbered 1, 2 and 3 in indicate the settings for each switch or key. These keys are used for selecting any of a plurality of master tests which are designated with numbers corresponding to the settings of the keys. For example, key 15 when set in position 1 and key 16 when set in position 1 actuates selecting relays in a circuit for making a plurality of tests under the control of master test 11. Key 15 when set in position 2 and key 16 when set in position 1 actuates the circuits for making a plurality of tests under the control of master test 21. Fig. 5 illustrates the circuits and equipment for four master test circuits 11, 13, 21 and 22 which may be actuated by the position of keys 15 and 16 in positions corresponding to the numerals of the test numbers. Keys 11, 12, 18, 23 and 25 are used for making the individual tests within each master test. The following chart gives an example of the character of tests which may be made by an operator of the portable test box 10.

| Master test | Cycle #1 | | Cycle #2 | |
|---|---|---|---|---|
| | Subtest | Relays | Subtest | Relays |
| 11 | | | | |
| Key 15-1 | 1 | 408-409 | 5 | 400-401 |
| Key 16-1 | 2 | 410-411 | | |
| 12 | | | | |
| Key 15-1 | 1 | 408-409 | 5 | 400-401 |
| Key 16-2 | 2 | 410-411 | 6 | 402-403 |
| | | | 7 | 404-405 |
| | | | 8 | 406-407 |
| 13 | | | | |
| Key 15-1 | 1 | 408-409 | 5 | 400-401 |
| Key 16-3 | 2 | 410-411 | 6 | 402-403 |
| | 3 | 412-413 | 7 | 404-405 |
| | 4 | 414-415 | 8 | 406-407 |
| Subtest relays for master test 13 combined as described. | | | | |
| 21 | | | | |
| Key 15-2 | 1 | 408-409 | 5 | 400-401 |
| Key 16-1 | 2 | 410-411 | 6 | 402-403 |
| | 3 | 412-413 | | |
| 22 | | | | |
| Combination subtest relay control as described. | | | | |
| Key 15-2 | 1 | 408-409 | | 400-401 |
| Key 16-2 | 2 | 410-411 | | 400-401 |
| | 3 | 412-413 | | 400-401 |
| | 4 | 408-409 | | 402-403 |
| | 5 | 410-411 | | 400-401 |
| | 6 | 410-411 | | 402-403 |
| | 7 | 412-413 | | 400-401 |
| | 8 | 412-413 | | 402-403 |
| | 9 | 412-413 | | 404-405 |
| 23 | | | | |
| Key 15-2 | 1 | 408-409 | | |
| Key 16-3 | 2 | 410-411 | | |

The subtests of Cycle #1 and Cycle #2 may be separately conducted, automatically combined under control of the master test relay or may be manually combined under the control of the master test relay and keys 23 and 25 as shown as described.

The test control circuit is operated by the insertion of the patching cords and plugs into the jacks of the portable test box 10 and the multiple jacks 35, 36, 37 and 48 and jacks and plugs 530 to 535 as required according to the setting of keys 15 and 16. Assuming for example that key 15 is in position 1 and key 16 is in position 1 and the plugs 31, 32, 33, 34 and 43, 44, 45 and 46 are placed in the jacks as associated on the drawings, the following circuits and equipment will be actuated for master test 11.

Relay 207 is energized over a circuit which may be traced from ground on the sleeve conductor of jack 36, through the sleeve of plugs 34 and 32 and the associated patching cord, sleeve of jack 19, lamp 27, sleeve of jack 34, sleeve of plugs 43 and 45 and associated patching cord, sleeve of jack 47 thence over conductor 64, winding of relay 207, winding of relay 300, resistance 309 to battery. Relay 300 does not operate in the circuit traced. Relay 207 establishes an obvious circuit for the operation of relay 204 which provides a source of ground and a source of battery to a number of different circuits. The circuits of interest at this time established by relay 204 are as follows: The biasing circuit for relays 200, 201, 300 and 302 may be traced from ground on contact 6 of relay 204 over conductor 233, upper winding of relays 300 and 302, resistance 202, upper windings of relays 201 and 200, contact 4 of relay 204, resistance 219 to battery. This biasing circuit also extends through resistance 203 to ground on contact 1 of relay 204 to give relays 200 and 201 the proper bias.

Relay 204 connects ground through its contact 2 to conductor 61 for initiating the operation of relays 53, 56, 57 and 60 under the control of interrupter 52. The interrupter relays 53, 56, 57 and 60 operate continuously in the following order to connect interrupted ground with lamp control conductors 68 and 74 for flashing the lamp of control box 10 as shown and as will be described:

| Step | Interrupter 52 | Relays | | | |
|---|---|---|---|---|---|
| | | 56 | 53 | 60 | 57 |
| 1 | Closes | Op | | Op | |
| 2 | Opens | | Op | | |
| 3 | Closes | Rls | | | Op |
| 4 | Opens | | Rls | | |
| 5 | Closes | Op | | Rls | |
| 6 | Opens | | Op | | |
| 7 | Closes | Rls | | | Rls |
| 8 | Opens | | Rls | | |

The first closure of interrupter 52 establishes a circuit from ground extending over conductor 61 from contact 2 of relay 204 through contact 3 of relay 56, winding of relay 56, resistance 55 to battery which operates relay 56. This ground places a shunt across the winding of relay 53 through contact 2 of the latter relay. The operation of relay 56 establishes a circuit for relay 60 from ground over conductor 61 through contact 4 of relay 56, contact 1 and the winding of relay 60, resistance 59 to battery. When interrupter 52 is opened shunt across the winding of relay 53 is removed causing relay 53 to operate from battery through resistance 54, winding of relay 53, contact 3 of relay 56 to ground on conductor 61.

The next closure of interrupter 52 causes the release of relay 56 by placing a ground shunt through contact 2 of relay 53 to a point between resistance 55 and the winding of relay 56. The release of relay 56 removes a shunt across the winding of relay 57 causing the latter relay to operate. Relay 57 was shunted by ground on conductor 61 through contact 4 of relay 56. This relay now operates over circuit from battery, resistance 58, winding of relay 57, contact 1 of relay 60 to ground on conductor 61. When the interrupter opens, relay 53 is released since it no longer is associated with ground through the interrupter to conductor 61. The next closure of the interrupter again operates relay 56 and causes the release of relay 60. Relay 56 operates from battery through resistance 55, winding of relay 56, contact 3 of relay 56, interrupter 52 to ground over conductor 61. The operation of relay 56 places a shunt around the winding of relay 60 from ground over conductor 61 through contact 4 of relay 56, inner contact of relay 57 to a point between resistance 59 and the winding of relay 60. This connects ground to both windings of relay 60 to cause its release. When the interrupter again opens, relay 53 is operated over a circuit as previously traced. When the interrupter 52 again closes, relay 56 is released because ground extends through the inner contact 2 of relay 53 to shunt the winding of relay 56. The release of relay 56 causes the release of relay 57. Since with relay 60 released there is no longer a ground associated with the winding of relay 57, the next opening of the interrupter causes the release of relay 53 by placing a shunt through contact 3 of relay 56 in the manner previously described. The operation and release of the interrupter relays continues in this manner. It is apparent from the above description that relays 53 and 56 operate twice during one operation of relays 57 and 60, so that 30 interruptions per minute are obtained through the contacts of relay 60, while 60 interruptions per minute are obtained through the contacts of relay 56. This interrupted ground is connected to conductors 79, 80, 81 and 82 through the contacts of the relay Fig. 4 to conductors 68 and 74 for flashing lamps as will be later described.

Another circuit established by the operation of relay 204 extends from ground on contact 8 of the latter relay, through contact 1 of relay 213, winding of relay 212 to battery which operates relay 212. With keys 15 and 16 both in position 1 for master test 11, two circuits are established for the operation of relays 205 and 206. A circuit may be traced from ground on the sleeve of jack 36, through the patching cord and associated jack 19 in the test box 10, position 1 of key 15, resistance 17, tip of jack 24, tip of plug 43 and the associated patching cord, tip of plug 46, tip of jack 48 thence over conductor 62, lower winding of relay 201, winding of relay 206 to battery. The second circuit is established from the same ground effective. When any of the master test selecting relays 208, 209, 210 or 211 are energized or released the association of the armature with the make-before-break contacts momentarily connects the two contacts and armature together in passing and thus connects substantially 130 volts across the control gap of tube 214 causing a main gap breakdown whenever one of these relays is either operated or released. This establishes a circuit for relay 213 from ground on contact 2 of relay 212 to the element of tube 214 and a secondary control circuit for tube 214. The operation of relay 213 disconnects ground from its contact 2 which ground is used for energizing the control equipment shown in Figs. 3 and 4. The circuit for relay 212 is opened at contact 1 of relay 213 but this relay is slow to release in order to provide sufficient time for all apparatus in Figs. 3 and 4 to be released when any of it is operated. Relay 212 releases after a time interval opening the circuit from ground through its contact 2, winding of relay 213, to the control element of tube 214. This extinguishes the tube 214 and restores relay 213 to normal. When relay 213 restores to normal the circuit for relay 212 is reestablished as originally traced to ground on contact 8 of relay 204. At this time ground is connected from contact 2 of relay 213, contact 1 of relay 212, conductor 241 to the armatures 2, 3 and 4 of relay 500 which controls master test number 11. Thus ground is connected to leads 235, 236 and 237 extending to the control apparatus Fig. 3 and the subtest cycle of relays Fig. 4.

The following is an example of the combinations of master test selecting relays created by the operation of keys 15 and 16:

| Master test | Master test selecting relays | | | | | | | | Master test relay operated |
|---|---|---|---|---|---|---|---|---|---|
| | 205 | 206 | 208 | 209 | 210 | 211 | 200 | 201 | |
| 11 | Up | Up | Down | Down | Up | Up | Down | Down | 500 |
| 13 | Up | Up | Down | Up | Up | Up | Up | Down | 502 |
| 21 | Up | Down | Down | Down | Up | Down | Down | Down | 501 |
| 22 | Down | Down | Down | Down | Down | Down | Down | Down | 503 | through position 1, key 16, resistance 22, ring of jack 24, plug 43, plug 47 and jack 48 over conductor 63, lower winding of relay 200, winding of relay 215 to battery. The resistances 17 and 22 in series with the circuits traced prevent the operation of relays 200 and 201 but cause the operation of relays 205 and 206. Relay 205 establishes a circuit for relay 210. Relay 206 establishes a circuit for relay 211. With relays 210 and 211 energized, a circuit may be traced for relay 500, which controls master test 11, from battery through its winding, contact 1 of relay 208, contact 2 of relay 209, contact 2 of relay 210, contact 1 of relay 211 to ground on contact 7 of relay 204.

The actuating circuit for tube 214, relays 212 and 213 will be described at this time since a circuit for this apparatus is established whenever any of the master test selecting relays 208, 209, 210 or 211 operate or release. The arrangement disclosed is a circuit and apparatus combination for a remotely controlled timing device which responds instantly when a circuit is established in box 10 for selecting a master test control relay according to numerical designation. It should, however, be borne in mind that the particular function of this apparatus is to open the current source supply circuit for insuring the release of all of the test control apparatus Figs. 3 and 4 before the selected master test circuits are made In the above table at least one of the relays 208, 209, 210 or 211 is operated for selecting master test control devices for master tests 11, 13 and 21 and all of these relays are released for selecting master test 22, but as herein described, either the operation or the release of any one of these selecting relays causes a breakdown of tube 214 for energizing the time delay circuit.

Ground connected to lead 236 extends through contact 1 of relay 310, contact 1 of relay 312, winding of slow operating relay 305 to battery. This ground from conductor 236 also extends through the make-before-break contact of relay 305 over conductor 75, winding of relay 408 to battery which operates relay 408 before the slow operating relay 305 disconnects the inner contact from the contact connected to conductor 75. Relay 408 in operating locks through contact 1 of relay 410, conductor 69, armature 2 of relay 305, inner contact 2 of relay 305 at the time that this relay operates and thence over conductor 236 as traced to ground on contact 2 of relay 213. The operation of relay 408 establishes a circuit for relay 409 from battery through the winding of the latter relay, contact 8 of relay 408, contact 3 of relay 410, contact 11 of relay 412, contact 5 of relay 414, conductor 70, contact 1 of relay 304, contact 2 of relay 395 to ground on conductor 236. The operation of relays 408 and 409 establishes the first subtest circuits for master test 11. These control circuits extend through the contacts of relays 408 and 409, contacts of master test relay 500 to testing circuit 550 for controlling the test of the unit of equipment 551. The specific nature of the subtest within the master test is not a part of this invention and therefore has been diagrammatically shown in order to simplify the disclosure. The control circuits for these tests have been shown by a single dotted line carried from the subtest control leads, Fig. 4, through a single contact of the master test relay 500 to the testing circuit 550. This dotted line represents a large plurality of control circuit leads carried through an equivalent number of contacts on the master test relays. However, only such control leads are connected from the subtest relay to the testing circuits by the master test relays as are required for master test 11 to control the individual equipment in the different testing circuits 550 responsive to the operation of each subtest relay combination, Fig. 4. Three different circuit combinations are created in the testing equipment which have been shown diagrammatically as combinations 552, 553, and 554, each being responsive successively to the operation of the subtest control relays successively operated for subtest 1, subtest 2 and subtest 5 which control mechanism of this testing circuit for making three tests of circuits and equipment in unit 551. This unit 551 may be a toll operator's position circuit having three tests made of the ring and lockout circuits and equipment of the position. Thus the operation of relays 408 and 409 controls the operation of testing equipment 552 for making a ringing test or a test of ringing equipment in toll position 551 which is connected by plugs and jacks to the testing circuit 550.

The next subtest 2 is made by the operation of key 23 in the portable test box 10. This connects ground extending from the sleeve of jack 36 as previously traced, through the contacts of key 23, sleeve of jack 24, sleeve of plugs 43 and 45 and jack 47, thence over conductor 64 through the winding of relay 207, over conductor 234, lower winding of relay 300, resistance 309 to battery operating relay 300. Relay 207 was already operated in a circuit previously traced through lamp 27. The operation of relay 300 by the application of direct ground through key 23 associates a ground through its contact and the winding of relay 304 to battery operating relay 304. The operation of relay 304 disconnects lead 70 from ground connected to the armature of relay 305 by lead 236 and connects this ground to lead 71. Ground associated with lead 71 establishes a circuit for relay 410 to initiate the second subtest. The circuit for relay 410 may be traced from ground on contact 2 of relay 213, contact 1 of relay 212, lead 241, contact 3 of master test relay 500, lead 236, contact 1 of relay 310, contact 1 of relay 312, contact 2 of relay 305, contact 1 of relay 304, lead 71, contact 4 of relay 415, contact 8 of relay 413, contact 7 of relay 411, contact 5 of relay 409, winding of relay 410 to battery. The operation of relay 410 opens the locking circuit for relay 408 which extended through contact 1 of relay 410 causing the release of relay 408. The release of relay 408 establishes a locking circuit for relay 410 from battery through its winding and its contact 6, contact 1 of relay 412, contact 1 of relay 408, conductor 69 which extends through the armature and contact 2 of relay 305 to ground over conductor 236. Upon the release of key 23 relays 300 and 304 are released. The release of relay 304 again associates ground from conductor 236 through its contact 1 to conductor 70 for the operation of relay 411. This circuit extends through contact 5 of relay 414, contact 11 of relay 412, contact 8 of relay 410, winding of relay 411 to battery. The operation of relay 411 opens the locking circuit for relay 409 which extended through its contact 1. The release of relay 409 establishes a locking circuit for relay 411 from battery through its winding and contact 5, contact 1 of relay 413, contact 1 of relay 409, thence over conductor 69, contact 2 of relay 305 to ground as traced over conductor 236. Subtest 2 of the apparatus unit controlled by master test 11 is now conducted. Conductors for subtest 2 also extend through the contacts of relay 500 controlling the test of unit of equipment 551 by the operation of testing mechanism 553. Conductor 82 associated with contact 3 of relay 60 extends a 30 IPM flashing signal to the control box 10. Conductor 82 may be traced from contact 3 of relay 60 through contact 6 of relay 411, thence over conductor 74, through resistance 308, winding of relay 300, winding of relay 209, conductor 64, sleeve of jack 47, sleeve of plugs 45 and 43, sleeve of jack 24 and lamp 207 which extends to ground on the sleeve of jack 36 as previously traced. It will be remembered that this lamp was lighted over a circuit from battery through resistance 309 over the circuit traced through relays 300 and 207, filament of lamp 27 to ground on the sleeve of jack 36. The ground from the interrupter relay 60 places a shunt on lamp 27 by reducing the current supply from battery through resistance 309 and causes the lamp 27 to be intermittently dimmed approximately 30 times per minute. This indicates that subtests 1 and 2 have been completed. Other lamps of the control box (not shown) are energized from the particular unit of equipment under test which are controlled by the testing equipment 550. This indicates to the operator of the control box 10 whether any fault is encountered in the unit of equipment under test. In master test 11 the cycle of tests in the lower relays Fig. 4 extends as far as test 2 connected by this operation of relays 410 and 411. Therefore, for this master test, relays 412, 413, 414 and 415 are not used. If the test man should again operate key 23, the cycle is terminated automatically under the control of the master test relay 500 and relay 408 would again be operated instead of proceeding through the cycle to operate relay 412. A recycle of tests 1 and 2 may thus be made by a third and fourth operation of key 23. It will be noted that the winding of relay 412 is not extended through the master test relay 500 but is extended through other master test relays such as 502, 503 and 501. A third energization of key 23 for master test 11 would energize relay 304 as previously described which would again connect ground to conductor 71. This ground over conductor 71 extends through contact 4 of relay 415, contact 8 of relay 413, armature and inner contact 7 of relay 411, contact 1 of master test relay 500, conductor 530, winding of relay 408 to battery. The energization of relay 408 opens the locking circuit for relay 410 which establishes a locking circuit for relay 408 through its contact 6, contact 1 of relay 410, thence over conductor 69 to ground on conductor 236. When key 23 is released, which releases relay 304 a circuit is established for relay 409 as previously traced through the lower contact of relay 410 which has now been released. Thus a repeat test of subtest 1 has been established through contact 1 of master test relay 500 which also prevented the cycle of tests from being extended by mistake.

Figure 4:
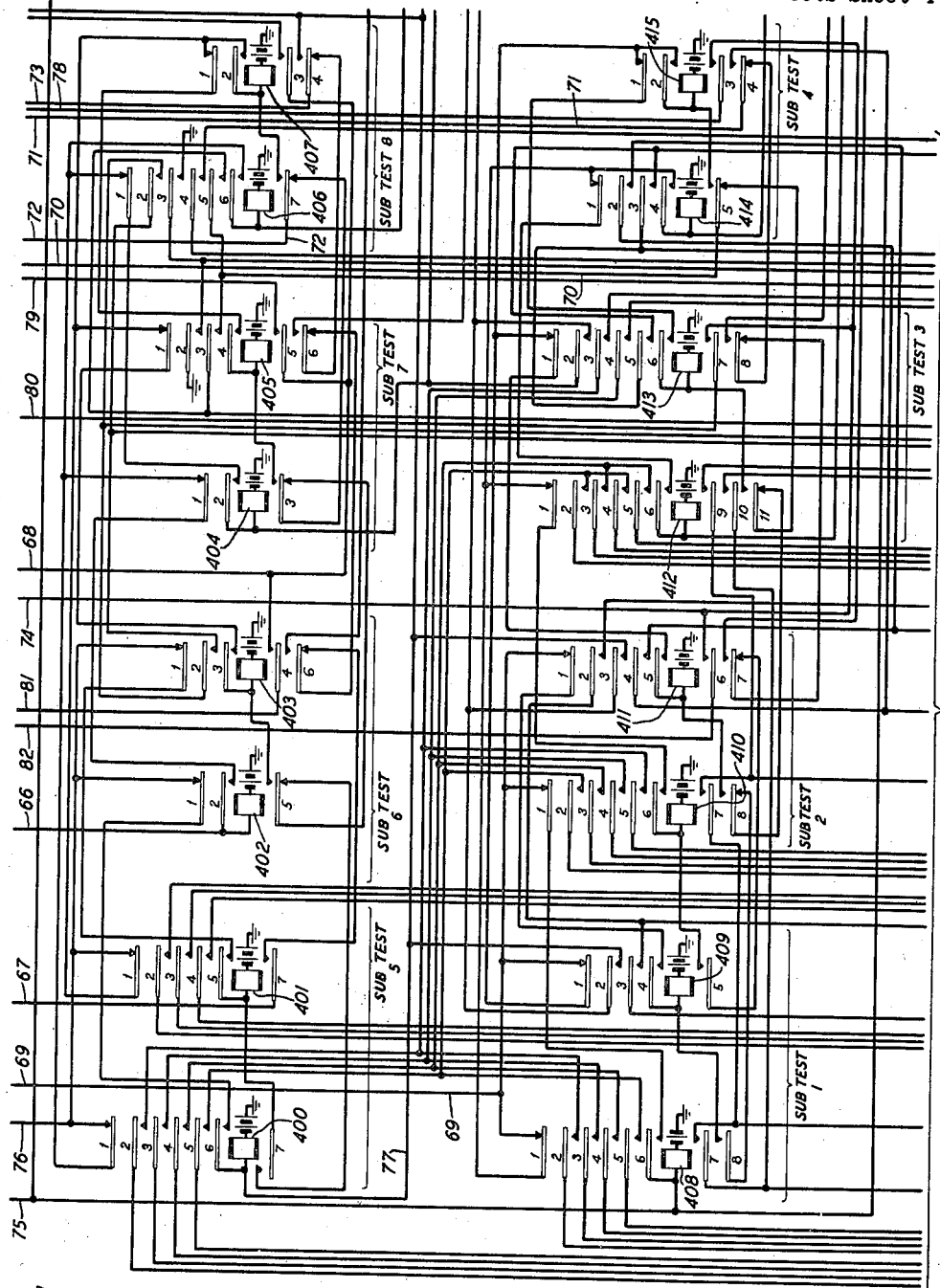
Fig. 4 illustrates the circuit and equipment employed in making a cycle of tests within any master test.

The third test made in master test 11 consists in operating the first relays 400 and 401 in the upper row of relays, Fig. 4. This controls subtest 5, the subtest numbers being arbitrarily given to the cycle of tests which do not necessarily indicate the number of the subtest within any particular cycle of tests. For this subtest key 25 is energized to control the establishment of a different character of subtest. Key 25 when operated connects ground from the sleeve of jack 36 over the patching cord circuits previously traced to the tip of jack 26, tip of plug 44 and the tip conductor of the patching cord, tip of plug 45, tip of jack 47, thence over conductor 65, lower winding of relay 302, resistance 303 to battery energizing relay 302. An obvious circuit is thus established for relay 312 which initiates a cycle of tests through the upper relays Fig. 4 and releases any relays in the lower cycle of tests which have previously been operated. Ground extending to relay 305 over lead 236 is open at contact 1 of relay 312 causing the release of relay 305. Relay 312 connects conductor 235 through its contact 2, winding of relay 310 to battery and also connects conductor 76 to conductor 73, the use of which will be later described. Relay 310 operates over a circuit traced from battery through its winding, contact 2 of relay 312, conductor 235, contact 2 of master test relay 500, conductor 241, contact 1 of relay 212, contact 2 of relay 213 to ground. Relay 310 establishes a locking circuit for itself through contact 3 of relay 304 to ground over conductor 235 as above traced. Conductor 236, it will be noted, is also opened by the operation of relay 310. This relay connects lead 237 through contact 2 of relay 304, winding of relay 311 to battery which establishes an operating circuit for relay 311 over the following circuit: Ground from contact 2 of relay 213, contact 1 of relay 212, contact 4 of relay 500, contact 2 of relay 310, contact 2 of relay 304, winding of relay 311 to battery. The opening of ground on lead 236 releases any of the relays in the lower subtest cycle 408 to 411 which were previously operated. The ground extended to the winding of relay 311 for its operation also extends over conductor 77, through the winding of relay 400 to battery operating this relay. Since relay 311 is slow in operating this circuit is established until the armature 2 of this relay opens its inner contact When relay 311 operates after a period of time, a locking circuit is established for relay 400 which extends from battery through its winding and contact 6, contact 1 of relay 402, conductor 76, armature and contact 2 of relay 311, contact 2 of relay 304, contact 2 of relay 310, thence over conductor 237 through contact 4 of master test relay 500 to ground on contact 2 of relay 213. The release of key 25 releases relay 302 which in turn releases relay 312. The release of relay 312 establishes a circuit for relay 401 which may be traced from battery through its winding, contact 7 of relay 400, contact 5 of relay 402, contact 3 of relay 404, contact 7 of relay 406, conductor 72, contact 3 of relay 312, contact 2 of relay 311, contact 2 of relay 304, contact 2 of relay 310 to ground, over conductor 237 as previously traced. Relay 401 in operating establishes a locking circuit for itself through its contact 5, contact 1 of relay 403, conductor 76, thence through contact 2 of relay 311 to the operating ground over conductor 237 as previously traced. The unit of equipment 551 tested by the subtest apparatus 554 under the control of relays 400 and 401, transmits appropriate signals to the test man as the unit of equipment is tested. The test man may now return to subtests 1 and 2 if he desires by again operating key 23. The operation of key 23 energizes relay 304 as previously described which disconnects lead 76 from lead 237 to remove the holding ground for relays 400 and 401 causing their release. Relays 408, 409, 410 and 411 are energized as previously described for repeating the subtests 1 and 2. The subtest cycle may include as many subtests as required and is only limited by the master relay and subtest advance keys. This may be regulated to include all of the plurality of subtests shown which may be repeated as often as required. With additional pairs of subtest relays the cycle of subtests may be made to include any number of subtests. The test man may now select another master test for testing a different unit of equipment.

Figure 3:
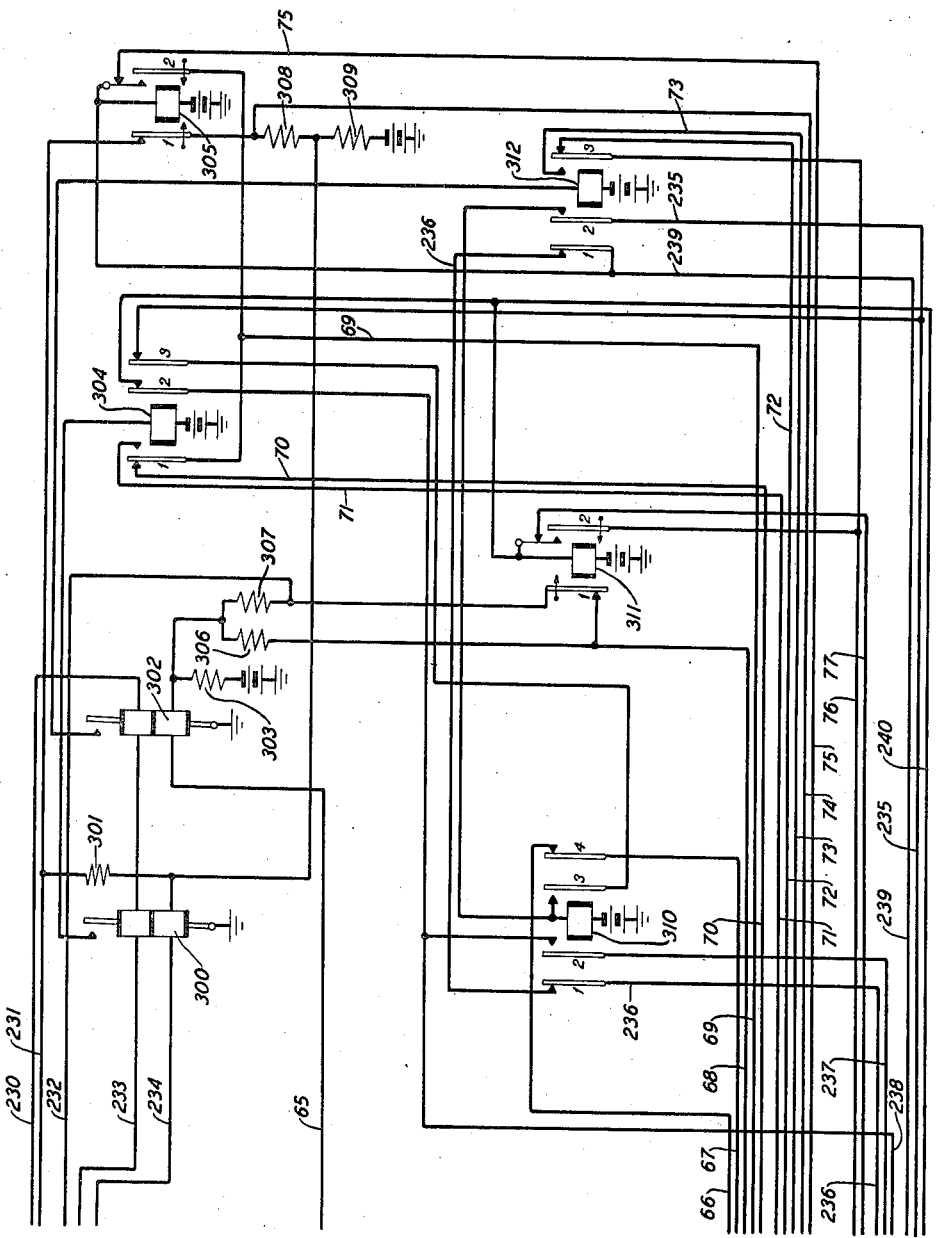
Fig. 3 illustrates a control circuit for the individual tests within a master test or cycle of tests.

For another example, let it be assumed that master test 22 is selected by the test man and consequently key 15 is moved into position 2 and key 16 is moved into position 2. This is the neutral position of both keys since master test 22 does not require the operation of any of the master test selecting relays 208, 209, 210 or 211. The mechanism for opening the current source supply circuit to the control relays Figs. 3 and 4, comprising relays 212, 213 and tube 214 must, therefore, be energized by the release of relay 210 or relay 211 which were operated for selecting master test 11. It will be remembered that the same mechanism was energized by the operation of these relays when master test 11 was selected. When keys 15 and 16 are moved to position 2, relays 210 and 211 are released as a result of the release of relays 205 and 206. The movement of keys 15 and 16 does not affect the operating circuit for relays 207 and 204 and consequently relay 212 is normally operated from ground on contact 8 of relay 204. The release of either relay 210 or 211 causes the relay armature 2 and both contacts of the continuity contact to be momentarily brought together in passing. This connects battery 218 of approximately 130 volts across the control gap of tube 214 to cause a main gap breakdown. The resistances for this circuit are arranged proportionately. For example, resistance 215 may be approximately 2,000 ohms, resistance 216 approximately 10,000 ohms, resistance 217 approximately 100,000 ohms and relay 213 approximately 2,500 ohms. The breakdown of tube 214 creates a circuit for relay 213 to ground on contact 2 of relay 212 which takes over the control of the tube until this ground is opened. Relay 213 opens the operating circuit for slow releasing relay 212. Relay 213 also opens the current source supply ground extending over conductor 241 through contacts 2, 3 and 4 of relay 500 to conductors 235, 236 and 237, used for master test 11, through contacts 1 and 2 of relay 503 to conductors 238 and 239, used for master test 22 and through contacts 5 and 6 of relay 502 to conductors 239 and 240, used for master test 13. The operating and locking circuits for all of the individual test control relays of Figs. 3 and 4 are held opened by the operation of relay 213 so that no circuits may be established for a period of time sufficient to guarantee the release of all test relays which were operated during the preceding test 11. The release of the slow release relay 212 also opens the current source supply circuit to the relays of Figs. 3 and 4 and opens the circuit for relay 213 which opens the control circuit for tube 214 which quenches the arc. The release of relay 213 reestablishes the operating circuit for relay 212 and the operation of relay 212 again connects the current source supply ground from contact 2 of relay 213 to conductor 241.

The release of relays 210 and 211 in addition to exciting tube 214 also operated relay 503 for establishing circuits for master test 22. This circuit may be traced from battery, through the winding of relay 503, contact 1 of relay 210, contact 1 of relay 211 to ground on contact 7 of relay 204. With relay 503 operated, relay 213 released and relay 212 again operated, circuits are established to initiate the operation of test 22. The dotted line through contact 8 of relay 503 diagrammatically illustrates the connection of a plurality of control leads between the subtest relays, Fig. 4, and the testing circuit 560 for controlling the test of the circuits and equipment in unit 561. A circuit is established for relay 305 from battery, through its winding, conductor 239, contact 1 of relay 503, contact 1 of relay 212 to ground, through contact 2 of relay 213. Relay 305 is slow to operate and consequently the circuit from ground extends through continuity contact 2 over conductor 75, winding of relay 408 to battery, operating the latter relay. This relay in operating establishes a locking circuit for itself which is completed when relay 305 has operated. The locking circuit for relay 408 may be traced from battery, through its winding and contact 6, contact 1 of relay 410, thence over conductor 69, armature and inner contact of relay 305, thence over conductor 239 to ground on contact 2 of relay 213, as previously traced. The operation of relay 305 also establishes an operating circuit for relay 409 traced from battery, through its winding, contact 8 of relay 408, contact 8 of relay 410, contact 11 of relay 412, contact 5 of relay 414, conductor 70, contact 1 of relay 304, contact 2 of relay 305, thence over conductor 239 to ground on contact 2 of relay 213 as previously traced through the master test relay 503. Relay 409 in operating establishes a locking circuit for itself through contact 1 of relay 411, conductor 69, contact 2 of relay 305 to ground on conductor 239.

It will be noted when master test 22 is initiated that ground from contact 2 of relay 213 extends through contact 1 of relay 212, over conductor 241, through contact 2 of relay 503 to conductor 238, and that conductor 238 extends through contact 2 of relay 304, winding of relay 311 to battery, operating relay 311. The latter relay is slow to operate and consequently ground is extended through the continuity contact 2, over conductor 77, winding of relay 400 to battery which operates relay 400. When relay 311 has operated, a locking circuit is established for relay 400 through its contact 6, contact 1 of relay 402, conductor 76, armature and inner contact 2 of relay 311, contact 2 of relay 304, thence over conductor 238 to ground on contact 2 of relay 213. The operation of relay 400 establishes a circuit for operating relay 401 from battery, through its winding, contact 7 of relay 400, contact 5 of relay 402, contact 3 of relay 404, contact 7 of relay 406, conductor 72, contact 3 of relay 312, contact 2 of relay 311, contact 2 of relay 304, and thence over conductor 238 to ground. Relay 401 establishes a locking circuit for itself through its contact 5, contact 1 of relay 403, thence over conductor 76 to ground as previously traced. The test conductors, through the contacts of relays 400 and 401, extend through the contacts of the master test relay 503 along with the test conductors of relays 408 and 409 in the lower cycle of subtests. Therefore, the test control conductors, through the contacts of relays 400 and 401, are combined for test operations with the lower cycle tests controlled by relays 408 and 409 for subtest 1 made by the testing mechanism 562. The control conductors through the contacts of relays 400 and 401 are combined with the control conductors through the contacts of relays 410 and 411 for subtest 2, or 412 and 413 for test 3. The arrangement is such that each operation of key 23 opens the circuit for relay 311 by operating relay 304. When relay 304 releases, responsive to the release of key 23, relay 311 is again operated provided key 25 was not operated at the same time as key 23. The reoperation of relay 311 reoperates relays 400 and 401.

The energization of key 23 for subtest 2 of master test 22 connects ground from jack 36 through the sleeve of the patching cord, sleeve of jack 19, contacts of key 23, sleeve of jack 24, sleeve of the associated patching cord, sleeve of jack 47, thence over conductor 64, winding of relay 207, lower winding of relay 300, resistance 309 to battery which energizes relay 300. The energization of relay 300 establishes an obvious circuit for relay 304. This connects ground as traced over conductor 239 through contact 2 of relay 205, contact 1 of relay 304, conductor 71 which extends through contact 4 of relay 415, contact 8 of relay 413, contact 7 of relay 411, contact 5 of relay 409, winding of relay 410 to battery. Relay 410 in operating opens the locking circuit for relay 408 which was established through contact 1 of relay 410. Relay 410 thus establishes a locking circuit for itself through its contact 6, contact 1 of relay 412, contact 1 of relay 408, conductor 69 which extends through contact 2 of relay 305 to ground on conductor 239. The release of key 23 causes the release of relay 304 which establishes an operating circuit for relay 411. This may be traced from battery through the winding of relay 411, contact 8 of relay 410, contact 11 of relay 412, contact 5 of relay 414, conductor 70, contact 1 of relay 304, contact 2 of relay 305 to ground on conductor 239. The operation of relay 411 opens the locking circuit for relay 409 which extended through contact 1 of relay 411. This establishes a locking circuit for relay 411 through its contact 5, contact 1 of relay 413, contact 1 of relay 409, thence over conductor 69 to ground on conductor 239 as previously traced. The operation previously described in releasing relay 311 when key 23 is actuated and reoperating this relay when the key is released takes place for subtest No. 2 for combining the functions of subtest relays 400 and 401 with the subtest relays 410 and 411 as described. Subtest No. 2 is now conducted and an interrupted flash is carried to the test man operating the test box 10. This flash is 30 interruptions per minute and extends from ground on contact 3 of relay 60 over conductor 82 through contact 6 of relay 411, conductor 74, resistance 308 to a junction point in the lamp operating circuit. It will be remembered that the lamp is lighted steady from battery through resistance 309, winding of relay 300, winding of relay 207, conductor 64, thence through the sleeve of jack 47, the patching cord and jack 24, lamp 27, to ground on the sleeve of jack 36. The interrupted ground from contact 3 of relay 60 shunts lamp 27, causing it to flash 30 times per minute to give the test man a characteristic signal for test No. 2. Since master test 22 includes three subtests in the cycle of tests, key 23 is again operated which again operates relays 300 and 304 over circuits as previously traced. This operation of relay 304 releases relay 311 and again associates ground from conductor 239 through contact 2 of relay 305 and contact 1 of relay 304 with conductor 71. For this master test conductor 71 extends through contact 4 of relay 415, contact 8 of relay 413, contact 7 of relay 411, conductor 520, contact 7 of master test relay 503, conductor 519, winding of relay 412 to battery operating the latter relay. The operation of relay 412 opens the locking circuit for relay 410 which extended through contact 1 of relay 412. Relay 412 establishes a locking circuit for itself through contact 1 of relay 414, contact 1 of relay 408, conductor 69 which, as previously traced, extends through contact 2 of relay 305, conductor 239 through contact 1 of master test relay 503, contact 1 of relay 212 to ground on contact 2 of relay 213. The release of key 23 causes the release of relays 300 and 304 to reoperate relays 311, 400 and 401 as previously described and establish an operating circuit for relay 413 which may be traced from battery through its winding contact 11 of relay 412, contact 5 of relay 414, conductor 70, contact 1 of relay 304, contact 2 of relay 305 to ground on conductor 239. Relay 413 establishes a locking circuit for itself through its contact 6, contact 1 of relay 415, contact 1 of relay 409, thence over conductor 67 to ground as previously traced. The operation of relay 413 opens the locking circuit for relay 411 which was traced through contact 1 of relay 413. Subtest No. 3 is now conducted and a 60-cycle flash is transmitted to the test operator. The 60-cycle flashing circuit may be traced from ground on contact 1 of relay 56 over conductor 80 through contact 7 of relay 413, conductor 74, resistance 308 to the point of the lamp operating circuit where it shunts this operating circuit to flash lamp 27, 60 times per minute.

If the test operator should again operate relay 23, the master test relay 503 controls the termination of the cycle of tests and in this case will not permit the operation of relays 414 and 415 which would be the case if the cycle of tests included four subtests. The test operator may repeat the cycle of tests by again operating key 23. Hence, this operation would again energize relay 408 through a contact provided on the master test relay 503. This operation of key 23 would again operate relay 300 and relay 304 and the circuit for reoperating relay 408 may be traced from battery through its winding, thence over conductor 530, contact 5 of relay 503, conductor 518, contact 8 of relay 413 which has remained operated, contact 4 of relay 415, conductor 71, contact 1 of relay 304, contact 2 of relay 305 to ground on conductor 239. Relay 408 establishes a locking circuit for itself through its contact 6, contact 1 of relay 410 which was released by the operation of relay 412, conductor 69 to ground as previously traced. The operation of relay 408 opens the holding circuit for relay 412 which, as traced, was carried through contact 1 of relay 408. Upon the release of key 23 and relay 304 a circuit is established for relay 409 extending from battery through its winding contact 8 of relay 408, contact 8 of relay 410, contact 11 of relay 412, contact 5 of relay 414 and thence over conductor 70 to ground on conductor 239 as previously traced. The operation of relay 409 establishes a locking circuit for itself through its contact 4, contact 1 of relay 411 to ground on conductor 69. The operation of relay 409 also opens the locking circuit for relay 413 which was traced through contact 1 of relay 409. The repeat test is made by repeated operations of key 23 as previously described. This repeat test may comprise only a portion of the cycle of tests, since in this case the cycle of tests may be terminated with any subtest. The operation of keys 15 and 16 for establishing circuits to energize apparatus for another master test will cancel apparatus operated during a previous test and restore all control apparatus to normal.

Continuing with test No. 22 other test combinations are made to combine the test conductors of the upper and lower subtest cycles of Fig. 4. After relays 408 and 409 have been operated for subtest No. 1, which as previously described also operates relays 400 and 401, any of the upper cycle of relays may be operated in combination with subtest 1 which use relays 408 and 409. With relays 408, 409, 400, and 401 operated and locked in position subtests 1 and 5 are combined. Key 25 may be actuated to energize subtest 6 relays 402 and 403 and release subtest 5 relays 400 and 401 while relays 408 and 409 are held locked in position. The energization of key 25 as previously traced operates relay 302 over conductor 65. Relay 302 establishes an operating circuit for relay 312. It should be noted in this instance that the energization of relay 312 does not establish an operating circuit for relay 310 since no ground is associated with conductor 235 through the contacts of master test relay 503. At this time relays 311 and 305 are held in an operated position. The energization of relay 312 thus connects ground from contact 2 of relay 213 through contact 1 of relay 212 thence over conductor 241 through contact 2 of master test relay 503, conductor 238, contact 2 of relay 304, contact 2 of relay 311, contact 3 of relay 312, thence over conductor 73 through contact 4 of relay 407, contact 6 of relay 405, contact 6 of relay 403, contact 7 of relay 401, conductor 67, contact 4 of relay 310, conductor 66, winding of relay 402 to battery. Relay 402 in operating opens the locking circuit for relay 400 causing its release and thus establishes a locking circuit for itself through its contact 2, contact 1 of relay 404, contact 1 of relay 406, conductor 76, contact 2 of relay 311 thence to ground over conductor 238 by way of contact 2 of relay 304. The release of key 25 releases relay 312 which establishes an operating circuit for relay 403. This circuit may be traced from battery through the winding of relay 403, contact 5 of relay 402, contacts 3 of relay 404, contact 7 of relay 406, conductor 72, contact 3 of relay 312, released, contact 2 of relay 311 and thence to ground over conductor 238 as previously traced. The operation of relay 403 opens the locking circuit for relay 401 causing its release and establishes a locking circuit for itself through contact 1 of relay 405, contact 1 of relay 401, conductor 76 to ground as traced. A test is therefore made with relays 408, 409, 402 and 403 operated which combines subtest 1 and subtest 6 for controlling the testing mechanism 565. The same action may continue by again operating key 25 to associate subtest 7 relays 404 and 405 with subtest 1 relays 408 and 409 if the master test relay calls for this character of operation. However, for master test 22 relays 408 and 409 are only combined with relays 400 and 401, for subtests 1 and 5 and with relays 402 and 403 for subtests 1 and 6. After these combinations have been made with subtest 1 relays 408 and 409 key 23 may be operated to energize subtest 2 relays 410 and 411. The circuits for this operation were previously traced which need not be repeated. Under this conditon, it will be remembered that relay 304 is energized which releases relay 311 causing the release of relays in the upper cycle of relays that were last to be operated. The release of key 23 and relay 304 causes the operation of relay 400 and the reoperation of relay 311 causes the operation of relay 401 along with relays 410 and 411 so that now subtest 2 and subtest 5 are combined. Subtest 2 may be combined with subtest 6 by actuating key 25 which operates relay 312 and causes the operation of relays 402 and 403 and the release of relays 400 and 401 in the same manner as described for combining subtest 1 with subtest 6. Subtest 3 is combined with subtest 5 by again actuating key 23. As previously described this causes the energization of relays 300 and 304 to release relay 311 and all of the relays in the upper cycle of Fig. 4 and causes the energization first of relay 412 and when key 23 is released the energization of relay 413. At this time relays 410 and 411 are released as previously described and the release of key 23 as above described causes the energization of relays 400 and 401 so that subtest 3 is combined with subtest 5. For combining subtest 3 with subtest 6 key 25 is actuated which energizes relay 312 to cause the energization of relays 402 and 403 and the release of relays 400 and 401 in the manner above described. For combining subtest 3 with subtest 7, key 25 is again energized which causes the energization of relay 312 but maintains relays 412 and 413 in an energized position. In this instance the energization of relay 312 establishes a circuit for subtest 7 relay 404 from battery through its windings, contact 2 of subtest 3 relay 413, conductor 515, contact 4 of master test relay 503, conductor 510 contact 6 of subtest 6 relay 403, contact 6 of subtest 7 relay 405, contact 4 of subtest 8 relay 407, conductor 73, contact 3 of relay 312, contact 2 of relay 311, contact 2, of relay 304 and thence to ground over conductor 238. The operation of relay 404 opens the locking circuit of relay 402 and establishes a locking circuit for itself through its contact 2, contact 1 of relay 406, contact 1 of relay 400, conductor 76, contact 2 of relay 311 and thence to ground over conductor 238. When key 25 is released an operating circuit for subtest 7 relay 405 is established from battery through its winding, contact 3 of relay 404, contact 7 of relay 406, conductor 72, normal contact 3 of relay 312 which was released, contact 2 of relay 311 to ground over conductor 238. The operation of relay 405 opens the locking circuit for relay 403 and establishes a locking circuit for itself through its contact 4, contact 1 of relay 407, contact 1 of relay 401, conductor 76 to ground as traced. Subtest 3 is thus combined with subtest 7 and in a similar manner subtest 3 may be combined with subtest 8 if so desired depending upon the wiring through the contacts of the master test relay. It is thus clear that any of the circuits through the subtest relays in the lower cycle could be combined differently as described with any of the subtest relays in the upper cycle of Fig. 4. Any of the subtest relays of the upper cycles may be combined in a like manner with the subtest relays of the lower cycle.

Let it now be assumed that the test operator moves key 15 into position 1 and key 16 into position 3 to energize equipment for controlling master test 13. The circuit through position 1 of key 15 is extended from ground on the sleeve of jack 36 over the sleeve of plugs 34 and 32, sleeve of jack 19, resistance 17, tip of jack 24, tip of plug 43 and plug 46, tip of jack 48, thence over conductor 62, winding of relay 201, winding of relay 206 to battery. This energizes relay 206 but does not energize relay 201, since relay 201 is marginal in operation and does not operate in series with resistance 17. The circuit through contact 3 of key 16 may be traced from the same ground on jack 36 through contact 3 of key 16, ring of jack 24, ring of plug 43 and plug 46, ring of jack 48, thence over conductor 63, lower winding of relay 200, winding of relay 205 to battery. Both relays 200 and 205 are energized since no resistance was in series with the winding of marginal relay 200. The operation of relay 206 energizes relay 211 over an obvious circuit. The energization of relay 200 establishes an operating circuit for relay 208 also over an obvious circuit and the energization of relay 205 establishes an operating circuit for relay 210 over an obvious circuit. With selecting relays 208, 210 and 211 operated a circuit is established for relay 502 controlling master test 13. This circuit may be traced from battery through the winding of relay 502, conductor 243, contact 1 of relay 208, contact 2 of relay 209, contact 2 of relay 210, contact 1 of relay 211, contact 7 of relay 204 to ground. The operation of relay 502 connects certain control circuit leads from the subtest relays, Fig. 4, to the testing mechanism 570 which is operated under the control of the subtest relays for testing the circuits of equipments of unit 571. The operation of any of the selecting relays 208, 210 or 211 causes a breakdown of tube 214 the same as previously described for the operation or release of one of these relays. When the armature of any or all relays 208, 210, 211 is momentarily connected to make-before-break contacts, the 130-volt battery 213 is connected across the control gap of tube 214 causing a main gap breakdown for the excitation of this tube. Relay 212 is normally energized and a circuit is immediately established for relay 213 from ground on contact 2 of relay 212, winding of relay 213 to the element of tube 214 which opens the current source supply circuit to the relays of Figs. 3 and 4. This circuit now controls the continued excitation of the tube 214 and maintains relay 213 energized until such time as relay 212 is released by the opening of its circuit through contact 2 of relay 213 to ground. Relay 212 is slow to release and thus holds relay 213 operated for a period of time sufficient to allow the release of all control apparatus. It will be remembered that the circuit for all of the test control apparatus, Figs. 3 and 4, extends to ground through contact 2 of relay 213 and contact 1 of relay 212. This circuit is thus maintained open during the operation of relay 213, the release of relay 213 and until relay 212 is reoperated. It should be noted that the control circuit ground is extended through the contacts of relays 212 and 213 over conductor 241 and contacts 5 and 6 of master test relay 502, thence over conductors 239 and 240 to the control apparatus, Fig. 3. Ground over conductor 239 is extended through the winding of relay 305 to battery and ground over conductor 240 extends through the winding of relay 311 to battery. Both relays 305 and 311 are slow to operate and before the operation of these relays a circuit is established for the relays of Fig. 4. Ground over conductor 239 extends through contact 2 of relay 305, over conductor 75, winding of relay 408 to battery. This relay locks as previously described through ground over conductor 69 after relay 305 has operated. The operation of relay 408 extends through contact 8 of relay 409, through contact 8 of relay 408 which extends from conductor 70 as previously described through contact 1 of relay 304, contact 2 of relay 205 to ground on conductor 239. Before relay 311 has operated, ground is extended from conductor 240 through contact 2 of relay 311, thence over conductor 77, winding of relay 400 to battery which operates relay 400. After relay 311 has operated, the locking circuit is established for relay 400 through its contact 6, contact 1 of relay 402, conductor 76, contact 2 of relay 311 to ground on conductor 240. The operation of relay 400 establishes an operating circuit for relay 401 through contact 7 of relay 400, contact 5 of relay 402, contact 3 of relay 404, contact 7 of relay 406, conductor 72, contact 3 of relay 312, contact 2 of relay 311 to ground on conductor 240. Therefore, for this subtest relays 408, 409, 400 and 401 are operated at the same time and the control leads through the contacts of these relays are carried through the contacts of the master test relay 502 to testing circuit 570. Both relays 311 and 305 remain operated throughout this master test. After the first subtest has been completed key 23 may be operated which energizes relays 410 and 411 in the same manner as previously described. Relays 400 and 401 remain energized during the second subtest of the lower cycle of relays in Fig. 4. This may continue throughout four subtests in the lower cycle of relays 408 to 415. When it is desired that relays 402 and 403 be operated along with any of the relays 408 to 415, key 25 is operated in addition to the operation of key 23 for combining the test leads of relays 402 and 403 with any of the test leads in the lower cycle of test relays in Fig. 4. The operation of key 25 energizes relay 302 over conductor 65 as previously described. Relay 302 energizes relay 312 over an obvious circuit. For this test the operation of relay 312 does not energize relay 310, since ground is not associated with conductor 235. The operation of relay 312 connects conductor 76 with conductor 73 which associates ground from conductor 240 through contact 2 of relay 311, contact 3 of relay 312, conductor 73, contact 4 of relay 407, contact 6 of relay 405, contact 6 of relay 403, contact 7 of relay 401, thence over conductor 67, contact 4 of relay 310, conductor 66, winding of relay 402 to battery. The operation of relay 402 opens the locking circuit for relay 400 which extended to contact 1 of relay 402. A locking circuit is also established from battery through the winding of relay 402 through its contact 2, contact 1 of relay 404, contact 1 of relay 400, thence over conductor 76 to ground. A circuit is now established for relay 403 from battery through its winding contact 5 of relay 402, contact 3 of relay 404, contact 7 of relay 406, thence over conductor 72, contact 3 of relay 312, which has now been released by the release of key 25, thence through contact 2 of relay 311, conductor 240 to ground associated with contact 6 of the master test relay 502. Relay 403 opens the locking circuit for relay 401 which was extended through contact 1 of relay 403 and relay 403 establishes a locking circuit for itself through its contact 3, contact 1 of relay 405, contact 1 of relay 401 to ground over conductor 76.

It will be noted for this test that relay 311 remains operated when key 23 and relay 304 are energized, which differentiates from the master test 22 which under that condition carried the circuit for relay 311 through contact 2 of relay 304 causing the release of relay 311 each time relay 304 was operated. The test conductors extending through the contacts of relays 402 and 403 may now be combined with any of the test conductors of the lower cycle for test 1, 2, 3 or 4, in each case compriisng the circuits through the contacts of two relays, such as 410 and 411 or 414 and 415. It may be desirable to combine the test leads carried through the contacts of relays 404 and 405 with any of the test leads of tests 1, 2, 3 and 4. This is accomplished by again operating key 25, which energizes relays 302 and 312 as described. The energization of relay 312 associates ground from conductor 240 through contact 2 of relay 311, contact 3 of relay 312, thence over conductor 73, contact 4 of relay 407, contact 6 of relay 405, contact 6 of relay 403, conductor 510, contact 4 of relay 502, conductor 514, winding of relay 404, to battery. It should be noted that the operation of relay 404 is under the control of the contacts of the master test relay 502. Relay 404 in operating opens the locking circuit for relay 402 and establishes a locking circuit for itself as soon as key 25 is released. This locking circuit is carried through contact 2 of relay 404, contact 1 of relay 406, contact 1 of relay 400, conductor 76, contact 2 of relay 311, to ground over conductor 240. The release of relay 312 establishes an operating circuit for relay 405 which may be traced from battery through its winding, contact 3 of relay 404, contact 7 of relay 406, conductor 72, contact 3 of relay 312, contact 2 of relay 311, to ground on conductor 240.

The operation of relay 405 opens the locking circuit for relay 403 which was established through contact 1 of relay 405. The locking circuit for relay 405 is established through its contact 4, contact 1 of relay 407, contact 1 of relay 401, to ground over conductor 76 as previously traced. Tests may now be made either separately through the contacts of relays 404 and 405 or in combination with any of the relays in the lower cycle, including relays 408 to 415. As previously stated, such contacts are carried through the contacts of the master test relay. The succeeding operation of key 25 again operates relays 302 and 312 which establishes a circuit for operating relay 406 traced from battery, through the winding of the latter relay, contact 4, of master test relay 502, contact 6 of relay 405, contact 4 of relay 407, conductor 73, contact 3 of relay 312, contact 2 of relay 311, to ground over conductor 240 as previously traced, through contact 6 of relay 502, contact 1 of relay 212 and contact 2 of relay 213. The operation of relay 406 opens the holding circuit for relay 404 which was established through contact 1 of relay 406. A locking circuit for relay 406 is established through its contact 6, contact 1 of relay 400, conductor 76, contact 2 of relay 311, to ground over conductor 240. The release of key 25 releases relays 302 and 312 to establish an operating circuit for relay 407 traced from battery, through its winding, contact 7 of relay 406, conductor 72, contact 3 of relay 312, contact 2 of relay 311, thence over conductor 240 to ground Relays 406 and 407 may be used for a separate test or in combination with any pair of relays in the lower cycle of relays, Fig. 4. If key 25 is again operated, relay 407 controls the reoperation of relays 400 and 401 since the cycle of tests terminates with the operation of relays 406 and 407. The circuit for relay 400 is traced from battery through its winding, conductor 77, through the inner contact 4 of relay 407, conductor 73, inner contact of relay 312, contact 2 of relay 311, to ground over conductor 240. Relay 401 is then energized as previously described.

Other master tests, including a plurality of subtests made by operating certain relays of Fig. 4 in a cycle, are shown in the foregoing list of master tests showing the subcombinations that may be created. Keys 15 and 16 are arranged for nine master test combinations. This may be amplified by the addition of another similar key, which three positions of the added key could be used with any position of the key shown. Thus twenty-seven master tests could be used with any cycle of subtests desired.

What is claimed is:

1. In a testing system, a control circuit having electrically operable equipment, a plurality of devices in said control circuit for effecting different characters of operations of said equipment, selecting relays, means for operating or releasing certain of said selecting relays for selectively operating said devices, a current source supply circuit for said electrically operable equipment normally established through the contacts of a current supply relay, a tube for creating a circuit for energizing said current supply relay to open said current source supply circuit and contact means in said selecting relays for causing a breakdown of said tube responsive to the operation or the release of one of said selecting relays.

2. In a testing system, a control circuit having electrically operable equipment, a plurality of devices in said control circuit for effecting different characters of operations of said equipment, selecting relays, means for operating or releasing certain of said selecting relays for selectively operating said devices, a tube, a current source supply circuit for said electrically operable equipment established through a contact on a first control relay normally operated and a second control relay normally released, said second relay having its operating circuit between a contact on said first relay and an element of said tube, contact means on said selecting relays for establishing a circuit to cause the breakdown of said tube responsive to the operation or the release of one of said selecting relays, said breakdown establishing an operating circuit for said second relay which establishes a secondary exciting circuit for said tube, means in said second relay for opening said current source supply circuit and for opening the operating circuit for said first relay, means responsive to the release of said first relay to open said secondary exciting circuit and release said second relay which reestablishes the operating circuit for said first relay and contact means in said first relay operated and said second relay released to reestablish the current source supply circuit for the operation of said equipment under the control of the device selected.

3. In a testing system, a control circuit having electrically operable equipment, a plurality of devices in said control circuit for effecting different characters of operations of said equipment, selecting relays, means for operating or releasing certain of said selecting relays for selectively operating said devices, a tube, a current source supply circuit for said electrically operable equipment established through the contact of a normally operative slow release relay and the contact of a normally released relay, said latter relay having its winding connected between a contact of said slow release relay and an element of said tube, contact means in said selecting relays for causing the breakdown of said tube responsive to the operation or the release of one of said selecting relays to establish an operating circuit for said normally released relay to open said current source supply circuit, said operating circuit establishing a secondary exciting circuit for said tube, means responsive to the operation of said normally released relay for opening the operating circuit for said slow release relay, means responsive to the release of said slow release relay to open said secondary exciting circuit for said tube and release the relay in said secondary exciting circuit, which reestablishes the operating circuit for said slow release relay and means responsive to the operation of said latter relay to reestablish said current source supply circuit for the operation of said equipment under the control of the device selected.

4. In a testing system, a test controlling circuit a plurality of electrically operable master test devices having identifying designations, a plurality of subtest relays differently controlled by each master test device arranged for operation successively in a cycle to successively control different subtesting circuits to variably test a unit of equipment, manually controlled switches each having a plurality of positions corresponding to said designations, control means including marginally operating relays for selectively operating said master test devices, means for moving said switches into positions for operating said control means to set up a master test device corresponding to the positions of said switches and means in a master test device for terminating the subtests at a relay within said cycle or at the end relay of said cycle.

5. In a testing system, a test controlling circuit having electrically operable mechanisms, a plurality of electrically operable master test devices designated by numerals, for effecting different characters of operations of said mechanisms, a plurality of subtest relays arranged for operation successively in a cycle to successively control different subtesting circuits, manually controlled switches each having a plurality of numbered positions, selecting relays, means for moving said switches into numbered positions for operating or releasing certain of said selecting relays to set up a master test device corresponding numerically to the positions of said switches, means including said mechanisms for operating said subtest relays, means in the master test devices for terminating the subtests at a subtest relay within said cycle or at the end subtest relay of said cycle, a current source supply circuit for said electrically operable mechanisms and subtest relays normally established through the contacts of a current supply relay, a tube for creating a circuit for energizing said current supply relay to open said current source supply circuit and contact means in said selecting relays for causing a breakdown of said tube responsive to the operation or the release of one of said selecting relays when said switches are readjusted to other numerical positions for selecting a different master test device.

6. In a testing system, a test control circuit, a plurality of selectable master test devices, a first plurality of subtest relays arranged for operation successively in a cycle for making a series of subtests under the control of a master test device, a second plurality of subtest relays arranged for operation successively in a cycle for making a series of subtests under the control of a master test device, means for selecting a master test device, means for successively operating the relays of said first and second plurality of subtest relays and means in each master test device for controlling different characters of test operations and for automatically controlling the termination of the cycle of operation of either the first or the second successive subtests at a predetermined subtest in either cycle depending upon the character of control exercised by the master test device in use.

7. In a testing system, a test control circuit, a plurality of selectable master test devices, a first plurality of subtest relays arranged for operation successively in a cycle for making a series of subtests within a master test, a second plurality of subtest relays arranged for operation successively in a cycle for making a series of subtests within a master test, means for selecting a master test device, means for combining the subtest established by a relay in said first plurality of subtest relays with any of the subtests established by relays in said second plurality of subtest relays, and means in said master test device for completing the cycle of operation of either the first or the second subtest relays with the termination of a particular subtest combination.

8. In a testing system, a test control circuit, a plurality of selectable master test devices, means for operating one of said master test devices, a plurality of subtest relays arranged for operation successively in a cycle for making a series of subtests within said master test, a switch for causing the successive advance from one subtest to another through a cycle of subtests, means in said master test device for terminating said cycle of subtests with a particular subtest and means in said master test device to cause the repeat of the subtests in said cycle under control of said switch upon the reoperation of said switch after said cycle has been terminated by said master test device.

9. In a testing system, a control circuit having a plurality of master test devices, a plurality of subtest devices common to said master test devices and electrically operable mechanisms common to said master test devices and subtest devices, selecting relays for selectively operating said master test devices, a remote control set, a plurality of testing circuits for testing a plurality of telephone circuits and equipments, means in said control set for variably operating said selecting relays for selectively operating different master test devices and for variably operating said electrically operable mechanisms under the control of the master test device selected, means in said master test devices for connecting control circuits from said subtest relays to said testing circuits and means in said control set for operating said subtest relays as controlled by the selected master test device for variably operating said testing circuits.

10. In a testing system, a control circuit having a plurality of master test devices, a plurality of subtest devices common to said master test devices and electrically operable mechanisms common to said master test devices and subtest devices, selecting relays for selectively operating said master test devices, a remote control set, a plurality of testing circuits for testing a plurality of telephone circuits and equipments, means in said control set for variably operating said selecting relays for selectively operating different master test devices and for variably operating said electrically operable mechanisms under the control of the master test device selected, means in said master test devices for connecting control circuits from said subtest relays to said testing circuits and means in said control set for operating combinations of said subtest relays for variably operating said testing circuits, said combinations being varied under the control of the different selected master test devices and said electrically operable mechanisms.

11. In a testing system, a control circuit having a plurality of master test devices, a plurality of subtest devices common to said master test devices and electrically operable mechanisms common to said master test devices and subtest devices, selecting relays for selectively operating said master test devices, a remote control set, a plurality of testing circuits for testing a plurality of telephone circuits and equipments, means in said control set for variably operating said selecting relays for selectively operating different master test devices and for variably operating said electrically operable mechanisms under the control of the master test device selected, means in said master test devices for connecting control circuits from said subtest relays to said testing circuits, means in said control set for operating said subtest relays as controlled by the selected master test device for variably operating said testing circuits, a time delay device for normally connecting a current source circuit to said electrically operable mechanisms, a cold cathode tube and relays in said time delay device and means on said selecting relays for causing a breakdown of said tube when any of said master test selecting relays are operated or released for actuating said time delay device relays to open said current source circuit for a predetermined period of time.

BURTON McKIM.